United States Patent
Higuchi et al.

[11] Patent Number: 5,995,301
[45] Date of Patent: Nov. 30, 1999

[54] OPTICAL APPARATUS WITH CAM CYLINDER HAVING CONCAVE AND CONVEX CAMS

[75] Inventors: Tatsuji Higuchi, Akiruno; Takashi Inoue; Yukinori Takahashi, both of Hachioji, all of Japan

[73] Assignee: Olympus Optical Co., Ltd., Tokyo, Japan

[21] Appl. No.: 09/149,605

[22] Filed: Sep. 8, 1998

[30] Foreign Application Priority Data

Sep. 9, 1997 [JP] Japan ................................... 9-244372

[51] Int. Cl.$^6$ .......................... G02B 27/10; G02B 15/14

[52] U.S. Cl. ......................... 359/699; 359/821; 359/823; 359/700

[58] Field of Search ...................................... 359/819, 823, 359/821, 817, 700, 699

[56] References Cited

U.S. PATENT DOCUMENTS 5,886,836  3/1999  Sasaki et al. ............................ 359/823

Primary Examiner—Georgia Epps
Assistant Examiner—Saeed Seyrafi
Attorney, Agent, or Firm—Volpe and Koenig, P.C.

[57] ABSTRACT

An optical apparatus according to the present invention includes a cylindrical holding barrel, a plurality of moving lens frames which are held in the holding barrel such that the moving lens frames are moved back and forth in an optical axis direction, and a cam cylinder fitted on an outer surface of the holding barrel so as to move the moving lens frames. The cam cylinder slides and rotates on the outer surface of the holding barrel, and includes a first cam cylinder and a second cam cylinder each having a cam section on an inner surface thereof, and one end face of the first cam cylinder and one end face of the second cam cylinder are coupled to each other such that the first and second cam cylinders are rotated together.

12 Claims, 3 Drawing Sheets

OPTICAL APPARATUS WITH CAM CYLINDER HAVING CONCAVE AND CONVEX CAMS

BACKGROUND OF THE INVENTION

The present invention relates to an optical apparatus such as a camera, which is so constituted that an optical element can be adjusted optically by rotating a cylindrical cam element.

In general, most of optical apparatuses such as cameras include an adjustment mechanism which is so constituted that a specific optical element such as a zoom lens is moved back and forth in the optical axis direction by rotating a cylindrical cam element to perform an optical adjustment such as a change in magnification of images.

The optical apparatus described above is increased in costs since a mold structure for molding the cam element is very complicated. To resolve this problem, it can be thought to mold a cylindrical cam element from a mold which is split into two in the optical axis direction. However, in this case, a parting line is formed in a predetermined position of the molded cam element or a position corresponding to a junction of the two-way split mold, and a recess for avoiding a burr is formed in a cam groove portion crossing the parting line. Therefore, another problem will occur in which a cam follower (e.g., pin) is easy to fall into the recess to prevent the cam follower from moving smoothly.

Jpn. Pat. Appln. KOKAI Publication No. 6-51178 discloses a mechanism for countering the latter problem. According to this mechanism, the cross section of a cam follower is elliptical to prevent the cam follower from falling into a recess for avoiding a burr.

It is to be wished that the optical apparatus as described in the above Publication is excellent in various points in which not only the cylindrical cam element is easily fabricated and the cam follower is smoothly moved but also the cam element is rugged, easy to insure accuracy, and compact in size because of a low parts count. However, the Publication does not refer to any technical means for satisfying these points.

BRIEF SUMMARY OF THE INVENTION

It is accordingly an object of the present invention to provide an optical apparatus such as a camera including a cylindrical cam element having the advantages of being rugged, easy to insure accuracy, and compact in size because of a low parts count.

In order to attain the above object, the optical apparatus of the present invention has the following feature in constitution. The other features of the present invention will be clarified in the Description of the Embodiment.

An optical apparatus comprises a cylindrical holding barrel, a plurality of moving lens frames which are held in the holding barrel such that the moving lens frames are moved back and forth in an optical axis direction, and a cam cylinder fitted on an outer surface of the holding barrel so as to move the moving lens frames, wherein the cam cylinder slides and rotates on the outer surface of the holding barrel, and includes a first cam cylinder and a second cam cylinder each having a cam section on an inner surface thereof, and one end face of the first cam cylinder and one end face of the second cam cylinder are coupled to each other such that the first and second cam cylinders are rotated together.

DETAILED DESCRIPTION OF THE INVENTION (Embodiment)

Figure 1:
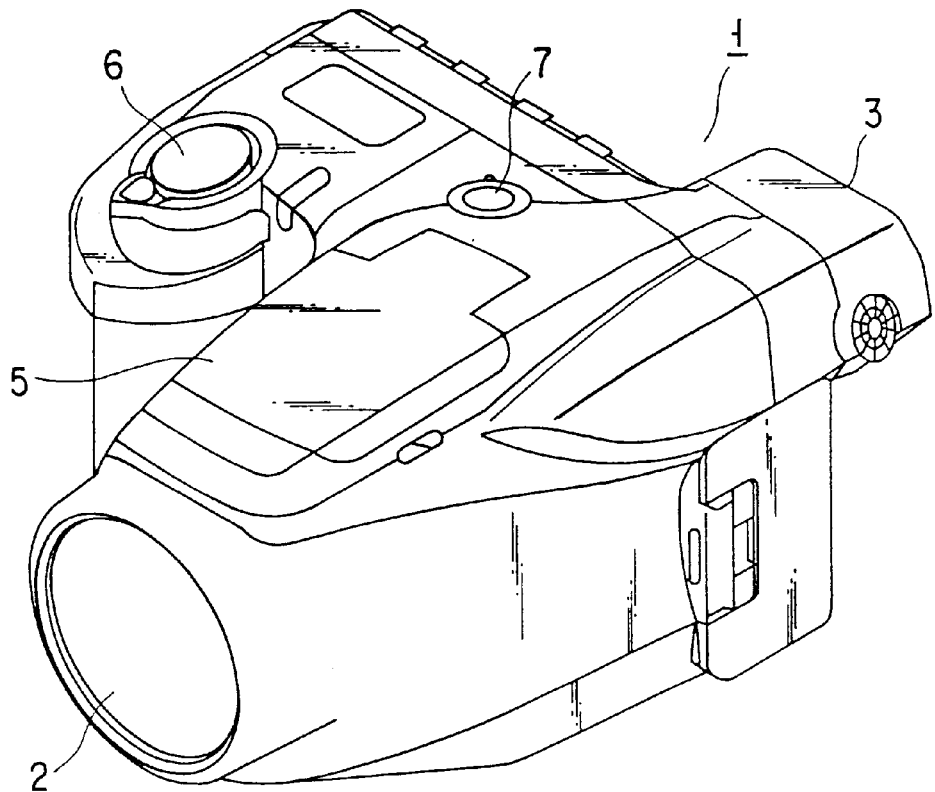
FIG. 1 is a front, perspective view of the outward appearance of an optical apparatus according to an embodiment of the present invention.
Figure 2:
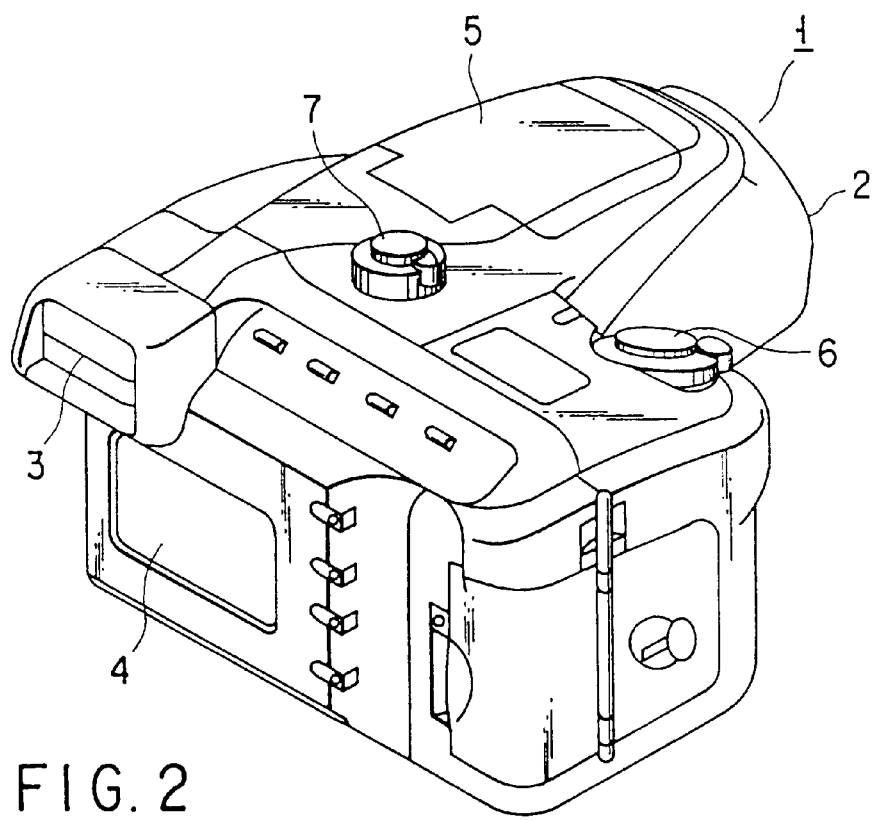
FIG. 2 is a back, perspective view of the outward appearance of the optical apparatus according to the embodiment of the present invention.

In FIGS. 1 and 2, reference numeral 1 indicates a camera body; 2, an optical system (including optical components such as a zoom lens); 3, a finder; 4, an LCD unit for monitoring; 5, a stroboscope; 6, a release button; and 7, a power switch. Hereinafter a lens barrel unit including the optical system 2, which is the main part of the present invention, will be described in detail.

Figure 3:
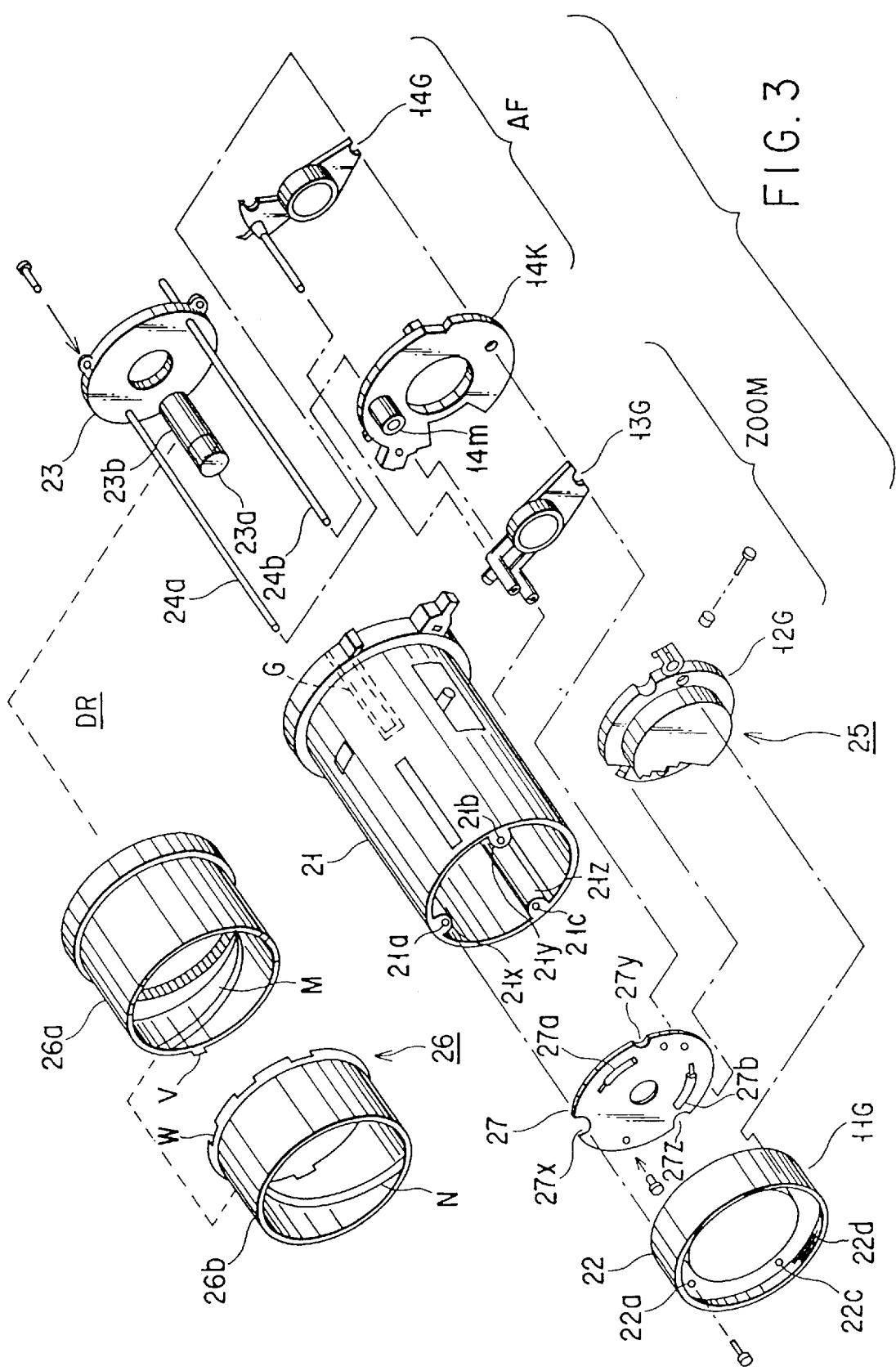
FIG. 3 is an exploded, perspective view of a lens barrel unit including an optical system built in a camera body of the optical apparatus according to the embodiment of the present invention.

A cylindrical case as illustrated in the center of FIG. 3 is a holding barrel 21 both ends of which are opened. A front lens barrel 22 is fixed to the front open end of the holding barrel 21, which is shown on the left side of FIG. 3, by a fixing means such as a screw, while a mounting substrate 23 is fixed to the rear open end of the holding barrel 21, which is shown on the right side of FIG. 3, by the fixing means.

One end of each of paired guide shafts 24a and 24b is inserted into a hole of the mounting substrate 23 and adhesively fixed thereto, and the other end thereof is fitted to and supported by the rim portion of the front lens barrel 22. These paired guide shafts 24a and 24b are arranged in the holding barrel 21 in parallel to the optical axis. A moving lens frame group 25 (12G, 13G, 14G, etc.) is guided by the guide shafts 24a and 24b and moved slidably in the optical axis direction in the holding barrel 21.

As will be clearly described later, the moving lens frame 14G moves along the guide shafts 24a and 24b, together with the moving lens frames 12G and 13G, while it is mounted on a moving frame 14K. For convenience of description, in this embodiment, an optical component with a lens is denoted by G and that without a lens is represented by K. The components 12G and 13G are used chiefly for zooming (ZOOM) and the components 14G and 14K are for autofocus (AF), though they are not necessarily differentiated definitely. The components 14G and 14K are driven so as to be relatively brought close to and separated from each other by means of an AF motor 14m provided on the moving frame 14K, thereby adjusting the focus automatically.

A plurality of ribs 21x, 21y and 21z (three ribs in this embodiment) are provided on the inner surface of the holding barrel 21 in parallel to the optical axis. These ribs extend from the front open end of the holding barrel 21 to the inner position thereof, which is beyond a light quantity adjusting unit 27 or an aperture shutter unit for adjusting a quantity of light passing therethrough. The ribs 21x, 21y and 21z therefore function as guide rails for the unit 27. The light quantity adjusting unit 27 is shaped like a disk and has notched portions 27x, 27y and 27z on its periphery. If the notched portions 27x, 27y and 27z are engaged with the ribs 21x, 21y and 21z, respectively to slide the light quantity adjusting unit 27 using the ribs as guides, the unit 27 can easily be inserted inwardly from the front open end of the holding barrel 21.

The ribs 21x, 21y and 21z are provided at one end with screw holes 21a, 21b and 21c for screwing the front lens barrel 22.

The front lens barrel 22 has mounting threads 22d formed on the inner surface thereof to detachably mount optical components such as an adapter lens and a filter from outside. The front lens barrel 22 also has screw inserting holes 22a to 22c corresponding to the screw holes 21a to 21c of the ribs 21x to 21z.

A cam cylinder 26, which is the principal element constituting a lens moving mechanism DR, is fitted on the outer surface of the holding barrel 21 such that it can slidably contact and rotate thereon. The cam cylinder 26 is designed to move the moving lens frame group 25 back and forth in the optical axis direction, and includes a first cam cylinder 26a having a convex cam M on its inner surface and a second cam cylinder 26b having a concave cam N thereon which are coupled to each other. The cam cylinder 26 is rotated by power transmitted from a driving source, which is constituted of a zooming motor 23a and a reduction mechanism 23b and fixed on the mounting substrate 23, by means of a power transmission mechanism.

Figure 4:
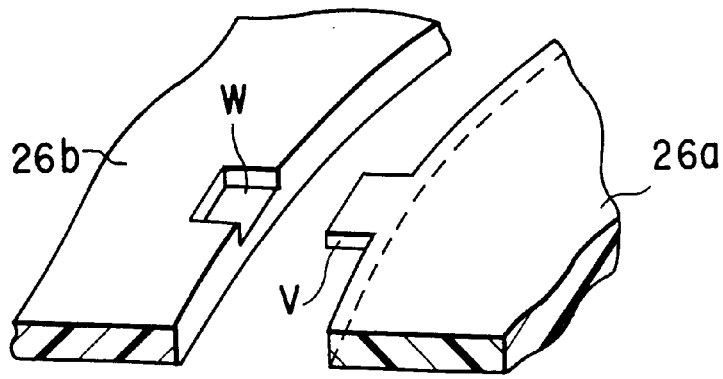
FIG. 4 is a partly perspective view of the constitution of a coupling portion of a cam cylinder of the optical apparatus according to the embodiment of the present invention.

As is clearly shown in FIG. 4, a convex portion V is formed on the coupling end face of the first cam cylinder 26a, and a concave portion W is provided in its corresponding portion of the coupling end face of the second cam cylinder 26b. These portions V and W can be engaged with each other. Thus, the two cam cylinders 26a and 26b are coupled to each other, without any special components, in such a manner that they cannot rotate in the circumferential direction relatively to each other.

Figure 5:
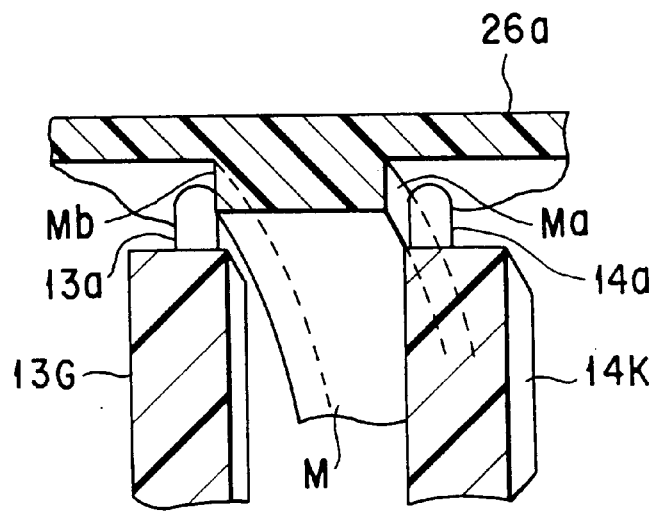
FIG. 5 is a partly perspective view of the constitution of a convex cam of the cam cylinder of the optical apparatus according to the embodiment of the present invention.

As illustrated in FIG. 5, the convex cam M of the first cam cylinder 26a has different cam faces Ma and Mb on both sides thereof. Cam followers 13a and 14a of the moving lens frame 13G and moving frame 14K are placed into contact with the cam faces Ma and Mb, respectively at a predetermined pressure. In other words, the moving lens frame 13G and moving frame 14K are displaced by a spring (not shown) in which direction they are brought close to each other, and pressed on the cam faces Ma and Mb, respectively. Thus, the moving lens frame 13G and moving frame 14K are moved in the optical axis direction by the different cam faces Ma and Mb by rotation of the cam cylinder 26.

Figure 6:
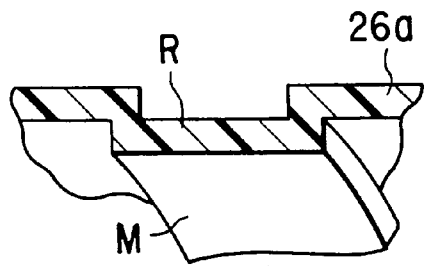
FIG. 6 is a partly perspective view of the constitution of a rim portion of the cam cylinder of the optical apparatus according to the embodiment of the present invention.

As shown in FIG. 6, a recess R is formed in a position of the outer surface of the first cam cylinder 26a, which corresponds to that of the convex cam. For this reason, the cam cylinder 26 is formed so as to have a uniform thickness.

Figure 7:
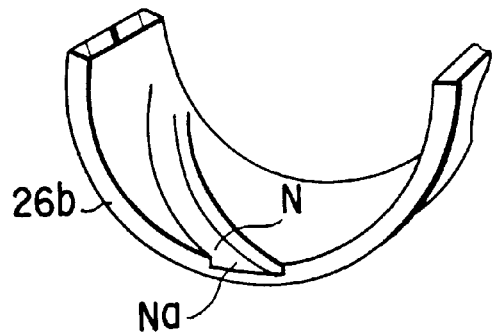
FIG. 7 is a partly perspective view of the constitution of a concave cam of the cam cylinder of the optical apparatus according to the embodiment of the present invention.

As illustrated in FIG. 7, the concave cam N of the second cam cylinder 26b is fitted to a cam follower pin (not shown) provided on the moving lens frame 12G. The frame 12G thus moves in the optical axis direction by rotation of the second cam cylinder 26b. The concave cam N has an open end Na which is closed by part of the front lens barrel 22 attached to the front end portion of the holding barrel 21.

Returning to FIG. 3, the cam cylinder 26 is fitted rotatably on the outer surface of the holding barrel 21, and not moved in the optical axis direction but rotated by the power transmitted from the driving source, which is constituted of the zooming motor 23a and reduction mechanism 23b, by means of a power transmission. Thus, the moving lens frame group 25 (12G, 13G, 14G, etc.) are moved in their own fashion in the optical axis direction.

The light quantity adjusting unit 27 has a pair of driving sources or solenoid plungers 27a and 27b for driving an aperture member and a shutter member, respectively.

The zooming motor 23a and reduction mechanism 23b, which serve as driving sources of the lens moving mechanism DR, and the solenoid plungers 27a and 27b, which serve as those of the light quantity adjusting unit 27, are held in the holding barrel 21 without protruding therefrom, as is a flexible printed board (not shown), which connects the driving sources of the mechanisms DR and 27 and the electric circuits provided outside the holding barrel 21.

It is needless to say that the present invention is not limited to the above embodiment and various changes and modifications can be applied thereto.

(Features of the Embodiment)

[1] In an optical apparatus according to the embodiment of the present invention, which comprises a cylindrical holding barrel 21, a plurality of moving lens frames 12G, 13G and 14G which are held in the holding barrel 21 such that the moving lens frames are moved back and forth in an optical axis direction, and a cam cylinder 26 fitted on an outer surface of the holding barrel 21 so as to move the moving lens frames, the cam cylinder 26 slides and rotates on the outer surface of the holding barrel 21, and includes a first cam cylinder 26a and a second cam cylinder 26b each having a cam section on an inner surface thereof, and one end face of the first cam cylinder 26a and that of the second cam cylinder 26b are coupled to each other such that they can be rotated together.

In the optical apparatus described above, all the cam sections are formed on the inner surface of the cam cylinder 26, and no slit-like portions penetrate the cam cylinder 26. Therefore, the mechanical strength of the cam cylinder 26 is high, and it is unlikely that dust will intrude thereinto from outside. It is unnecessary to take a parting line into consideration at all. Since, furthermore, the cam cylinder 26 can be divided into the first and second cam cylinders 26a and 26b, their molding structures can be simplified. Consequently, the molding costs are low and the accuracy of required components is easy to insure.

[2] In the optical apparatus as described in above item [1], a convex portion V is formed on the one end face of the first cam cylinder 26a, and a concave portion W is formed in a position of the one end face of the second cam cylinder 26b, which corresponds to the convex portion V, the convex portion V and the concave portion W being engaged with each other.

In the foregoing optical apparatus, the convex and concave portions are engaged with each other like the teeth of a comb; therefore, the two cam cylinders 26a and 26b are coupled integrally as one component, without any special components, in such a manner that they cannot rotate relatively to each other. Consequently, the components can easily be assembled and the cam cylinder 26 is not likely to increase in whole length.

[3] In the optical apparatus as described in above item [1] or [2], the first cam cylinder 26a has a convex cam M formed on the inner surface thereof, and the convex cam M has different cam faces Ma and Mb on both sides thereof.

In the above-described optical apparatus, the cam faces Ma and Mb can be made correspondent with the moving lens frame 13G and the moving frame 14K, respectively. The first cam cylinder 26a having such a constitution can be formed by a "sliding cutting type" mold with a simple structure, with the result that the molding costs can be reduced and the molded product can be increased in precision.

[4] In the optical apparatus as described in above item [3], a recess is formed in a position of the outer surface of the first cam cylinder 26a which corresponds to that of the convex cam M.

Since, in the above optical apparatus, the first cam cylinder 26a is formed to have a uniform thickness, a so-called mold distortion does not occur at the time of molding; therefore, a predetermined level of dimension precision of the cam section can be maintained.

[5] In the optical apparatus as described in any one of above items [1] to [4], the second cam cylinder 26b has a concave cam N formed on the inner surface thereof, and the concave cam N has an open one end which is closed by part of the front lens barrel 22 attached to the front end portion of the holding barrel 21.

Since, in the foregoing optical apparatus, one end of the concave cam N is opened, the second cam cylinder 26b can be formed by a "revolving cutting type" mold with a simple structure, and thus the molding costs are low. Since, furthermore, part of the front lens barrel 22 is used as a stopper of the cam follower of the moving lens frame group 25, any additional components are not required. In this respect, too, the apparatus can be manufactured at low costs and can be assembled easily.

We claim:

1. An optical apparatus comprising a cylindrical holding barrel, a plurality of moving lens frames which are held in the holding barrel such that the moving barrel lens are moved back and forth in an optical axis direction, and a cam cylinder fitted on an outer surface of the holding barrel so as to move the moving lens frames, wherein the cam cylinder slides and rotates on the outer surface of the holding barrel, and includes a first cam cylinder and a second cam cylinder each having a cam section on an inner surface thereof, and one end face of the first cam cylinder and one end face of the second cam cylinder are coupled to each other such that the first and second cam cylinders are rotated together.

2. The optical apparatus according to claim 1, wherein a convex portion is formed on the one end face of the first cam cylinder, and a concave portion is formed in a position of the one end face of the second cam cylinder, which corresponds to the convex portion, the convex portion and the concave portion being engaged with each other.

3. The optical apparatus according to claim 1, wherein the first cam cylinder has a convex cam formed on the inner surface thereof, and the convex cam has different cam faces on both sides thereof.

4. The optical apparatus according to claim 2, wherein the first cam cylinder has a convex cam formed on the inner surface thereof, and the convex cam has different cam faces on both sides thereof.

5. The optical apparatus according to claim 3, wherein a recess is formed in a position of the outer surface of the first cam cylinder which corresponds to the convex cam.

6. The optical apparatus according to claim 4, wherein a recess is formed in a position of the outer surface of the first cam cylinder which corresponds to the convex cam.

7. The optical apparatus according to claim 1, wherein the second cam cylinder has a concave cam formed on an inner surface thereof, and the concave cam has an open one end which is closed by part of the front lens barrel attached to a front end portion of the holding barrel.

8. The optical apparatus according to claim 2, wherein the second cam cylinder has a concave cam formed on an inner surface thereof, and the concave cam has an open one end which is closed by part of the front lens barrel attached to a front end portion of the holding barrel.

9. The optical apparatus according to claim 3, wherein the second cam cylinder has a concave cam formed on an inner surface thereof, and the concave cam has an open one end which is closed by part of the front lens barrel attached to a front end portion of the holding barrel.

10. The optical apparatus according to claim 4, wherein the second cam cylinder has a concave cam formed on an inner surface thereof, and the concave cam has an open one end which is closed by part of the front lens barrel attached to a front end portion of the holding barrel.

11. The optical apparatus according to claim 5, wherein the second cam cylinder has a concave cam formed on an inner surface thereof, and the concave cam has an open one end which is closed by part of the front lens barrel attached to a front end portion of the holding barrel.

12. The optical apparatus according to claim 6, wherein the second cam cylinder has a concave cam formed on an inner surface thereof, and the concave cam has an open one end which is closed by part of the front lens barrel attached to a front end portion of the holding barrel.

* * * * *